(12) United States Patent
Keller

(10) Patent No.: US 10,358,314 B2
(45) Date of Patent: Jul. 23, 2019

(54) METHOD AND DEVICE FOR CREATING PACKS OF PRINTED PRODUCTS

(71) Applicant: Alex Keller, Rapperswil (CH)

(72) Inventor: Alex Keller, Rapperswil (CH)

(73) Assignee: FERAG AG, Hinwil (CH)

(*) Notice: Subject to any disclaimer, the term of this patent is extended or adjusted under 35 U.S.C. 154(b) by 0 days.

(21) Appl. No.: 15/053,729

(22) Filed: Feb. 25, 2016

(65) Prior Publication Data

US 2016/0257522 A1 Sep. 8, 2016

(30) Foreign Application Priority Data

Mar. 2, 2015 (CH) ...................................... 0326/15

(51) Int. Cl.

| | |
|---|---|
| *B65H 39/115* | (2006.01) |
| *B65H 29/00* | (2006.01) |
| *B65H 39/075* | (2006.01) |
| *B65H 39/10* | (2006.01) |
| *B65G 9/00* | (2006.01) |
| *B65G 1/08* | (2006.01) |

(52) U.S. Cl.
CPC .......... *B65H 39/115* (2013.01); *B65G 9/006* (2013.01); *B65H 29/003* (2013.01); *B65H 39/075* (2013.01); *B65H 39/10* (2013.01); *B65G 1/08* (2013.01); *B65H 2301/437* (2013.01); *B65H 2301/4311* (2013.01); *B65H 2301/4353* (2013.01); *B65H 2301/4453* (2013.01); *B65H 2405/55* (2013.01); *B65H 2405/5521* (2013.01); *B65H 2701/1916* (2013.01)

(58) Field of Classification Search
CPC ............ B65H 2405/551; B65H 29/003; B65H 2301/4311; B65H 39/115; B65H 2405/55; B65H 39/075; B65H 2301/437

See application file for complete search history.

(56) References Cited

U.S. PATENT DOCUMENTS 3,989,234 A * 11/1976 Watkiss ................. B65H 3/446
270/58.22
5,098,076 A * 3/1992 Kelsey .................. B65H 39/02
198/347.1

(Continued)

FOREIGN PATENT DOCUMENTS

WO WO 2013/159238 A1 10/2013

*Primary Examiner* — Jennifer E Simmons
(74) *Attorney, Agent, or Firm* — Pauley Erickson & Kottis

(57) ABSTRACT

A postpress system (1) and method for producing and processing product units (P), in particular printed end products (P) with printed product collections comprising a plurality of products, selected from the group of wrapping products, and a plurality of part products and/or inserts, to make route adapted stacks or packs, at least some of the printed end products (P) being product units which have been customized for specific addressees are proposed. By using feed devices (3) which each comprise a supply conveyor (31), a preparation circuit (32) with a plurality of transport units (321) and an output conveyor (33), printed products (D) are fed in a controlled fashion to the holding units (21) with reliability. A sorting device (6) with at least one directing group with at least one gate (62), a transit section (612) and at least one supply section is used to correct faults, or deviations in the product sequence from the production sequence.

18 Claims, 7 Drawing Sheets

(56) References Cited

U.S. PATENT DOCUMENTS

| | | | | |
|---|---|---|---|---|
| 5,280,895 A | * | 1/1994 | Meier | B65H 39/06 270/58.03 |
| 5,326,209 A | * | 7/1994 | Duke | B65H 29/62 198/347.1 |
| 5,975,280 A | * | 11/1999 | Cote | B65H 29/02 198/459.4 |
| 2002/0023861 A1 | * | 2/2002 | Mileaf | B07C 3/00 209/542 |
| 2010/0262279 A1 | * | 10/2010 | Jost | B07C 3/08 700/220 |
| 2015/0114797 A1 | * | 4/2015 | Honegger | B65H 29/003 198/418.3 |

* cited by examiner

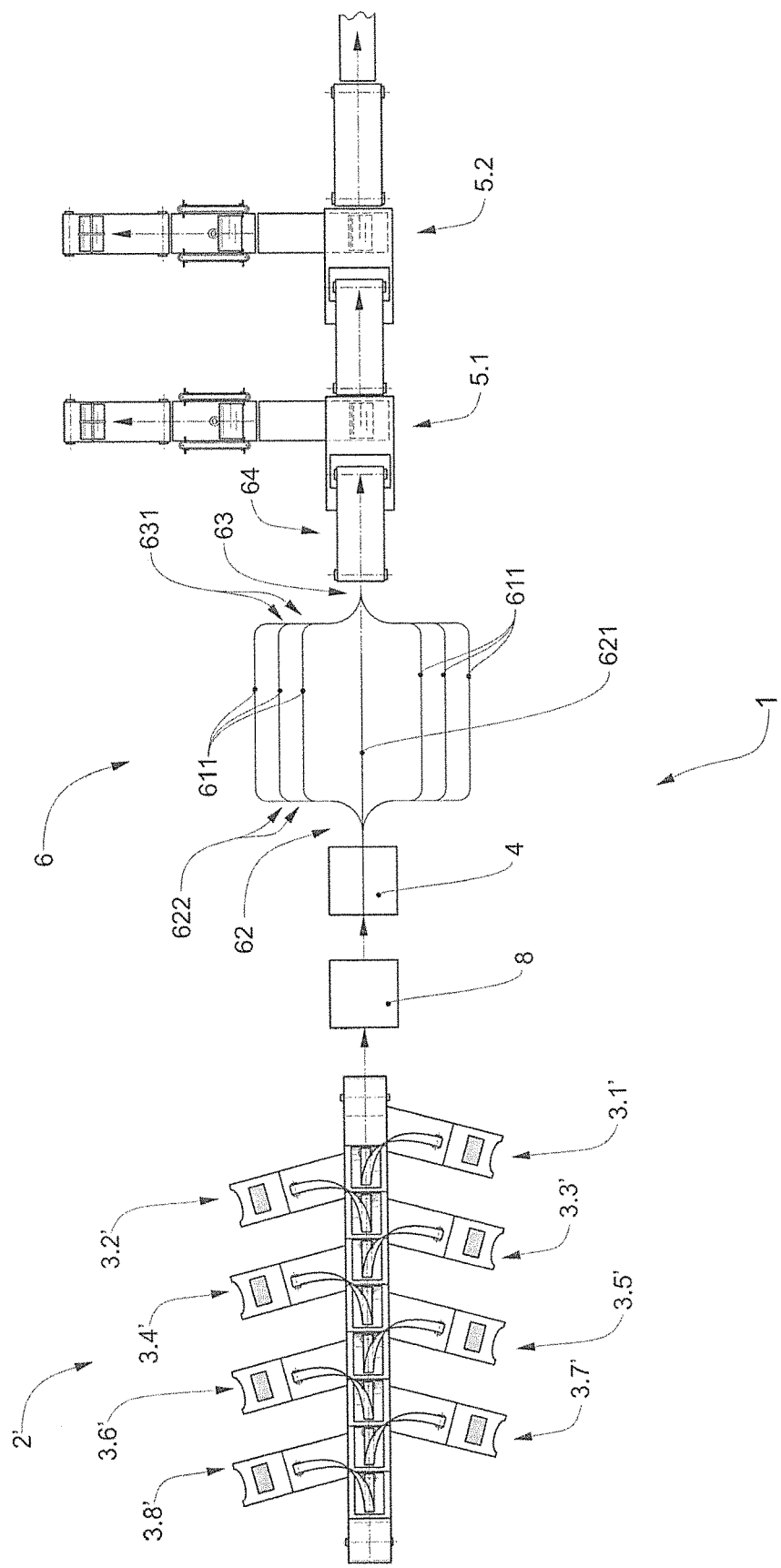

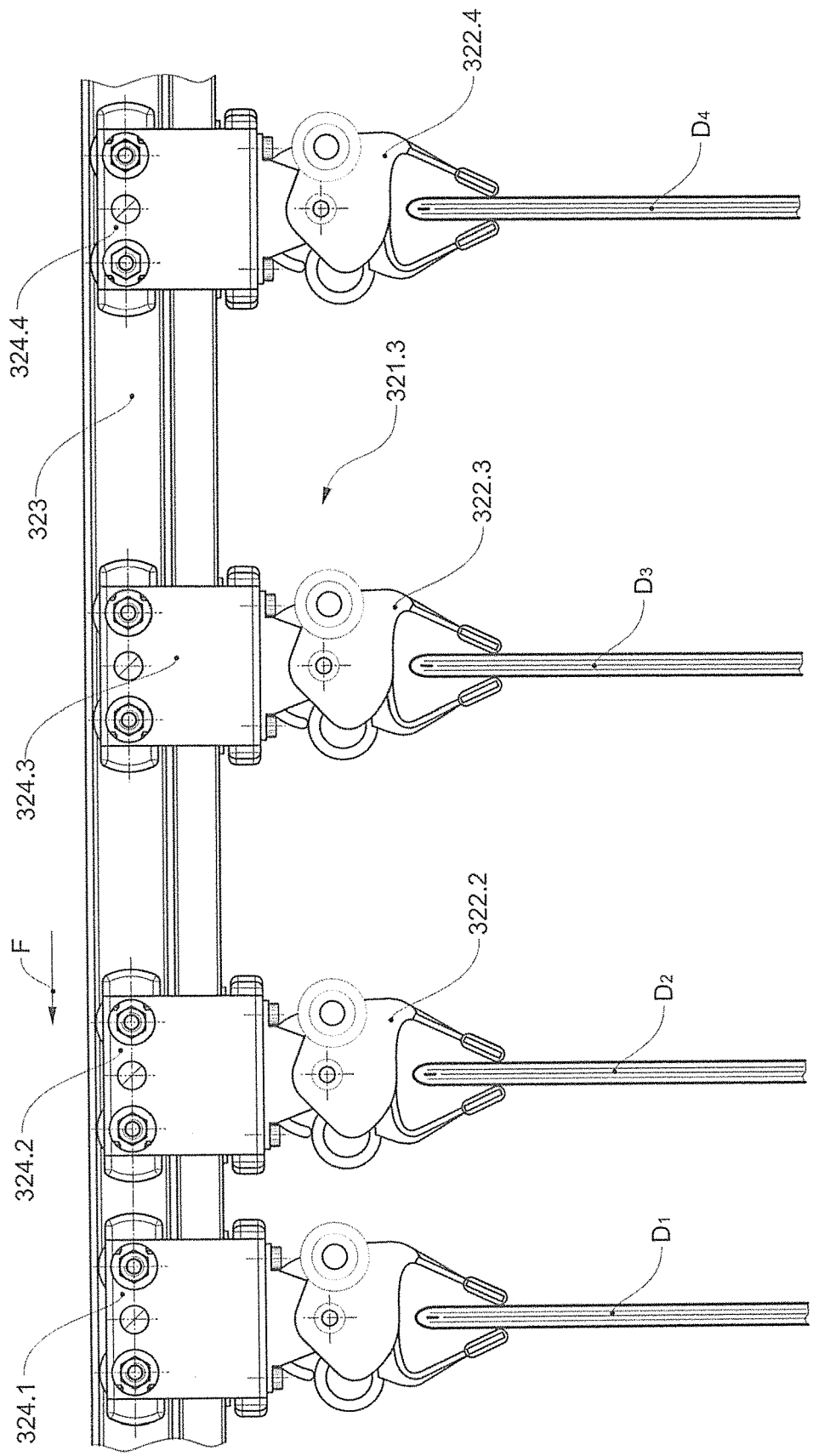

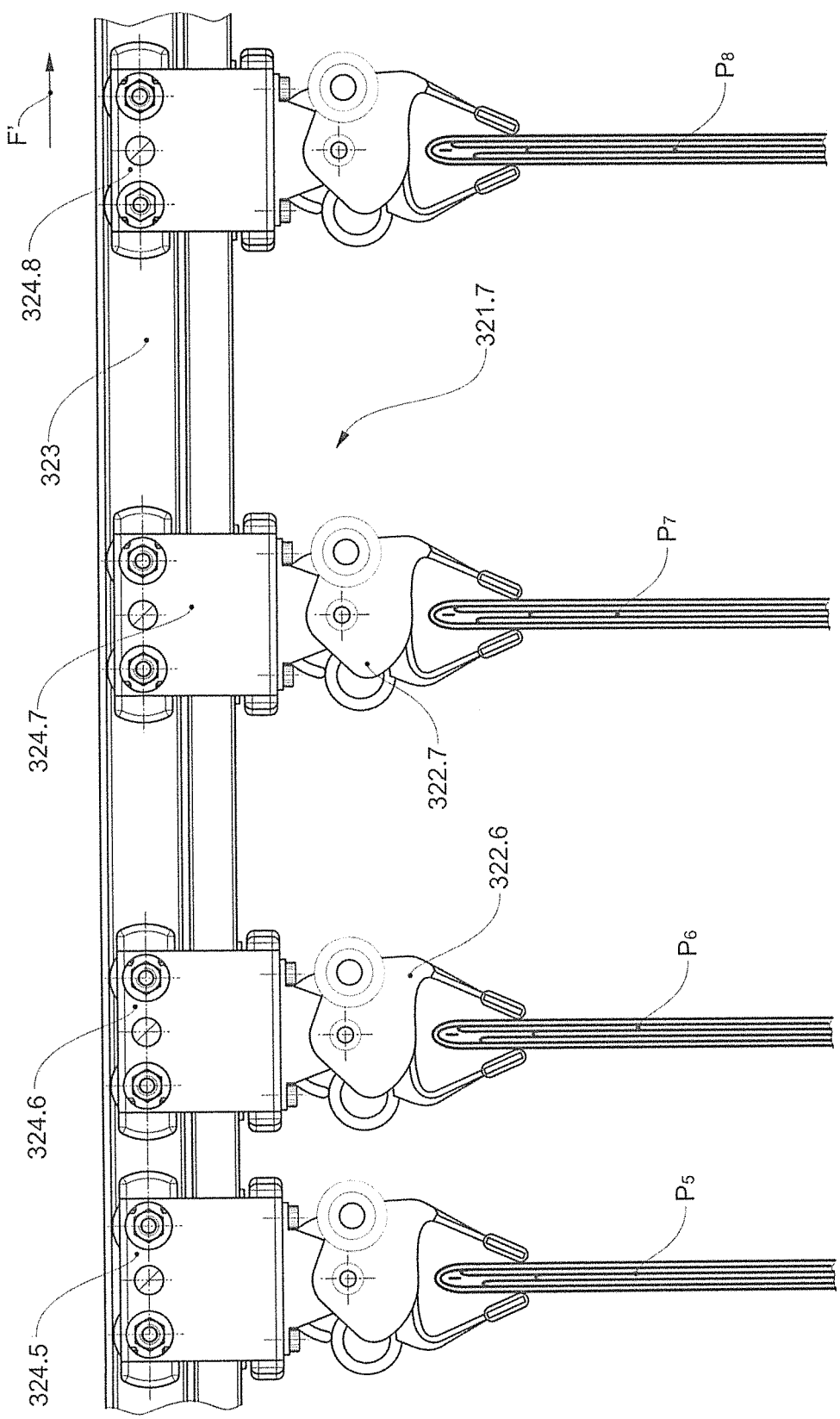

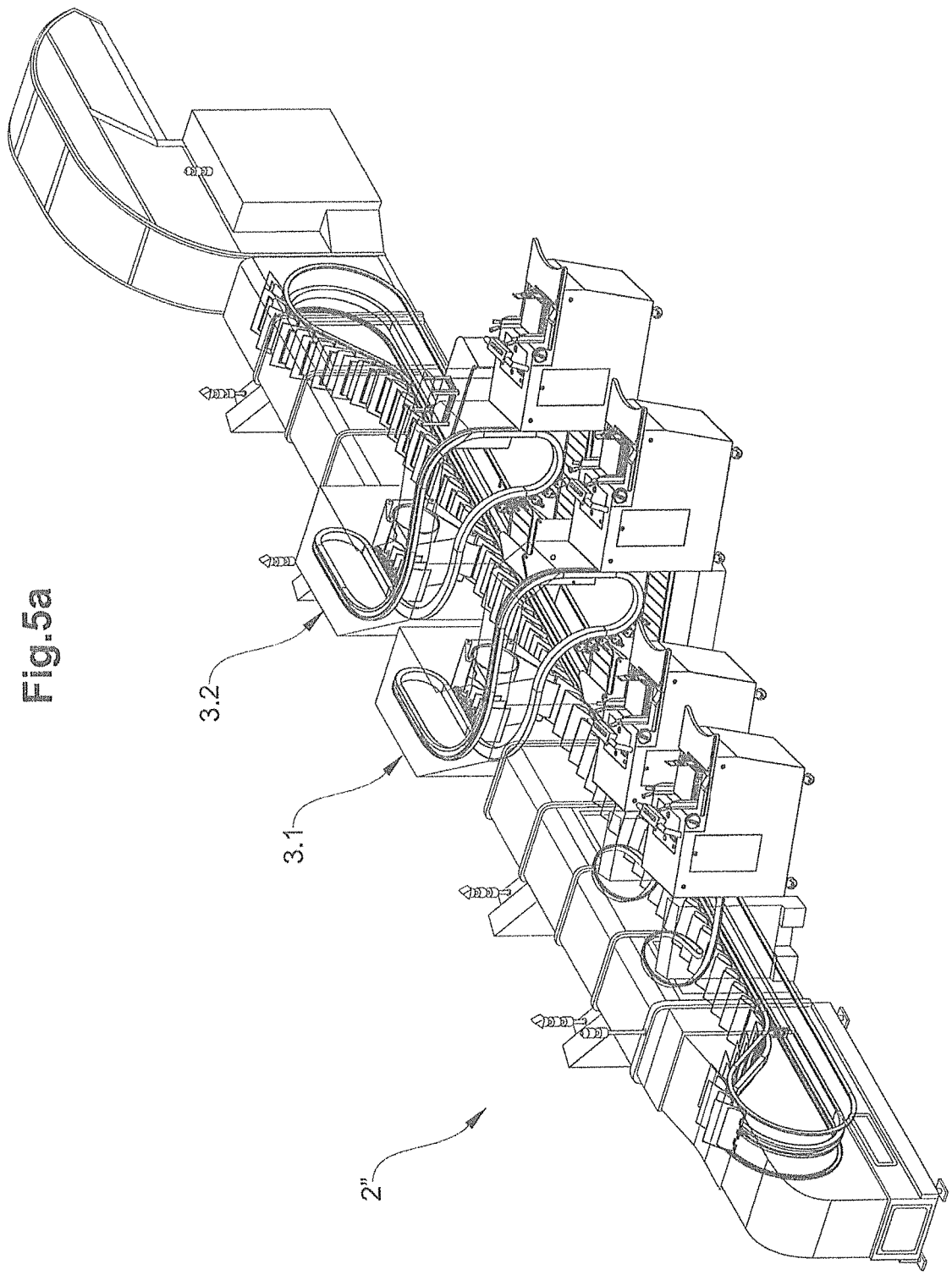

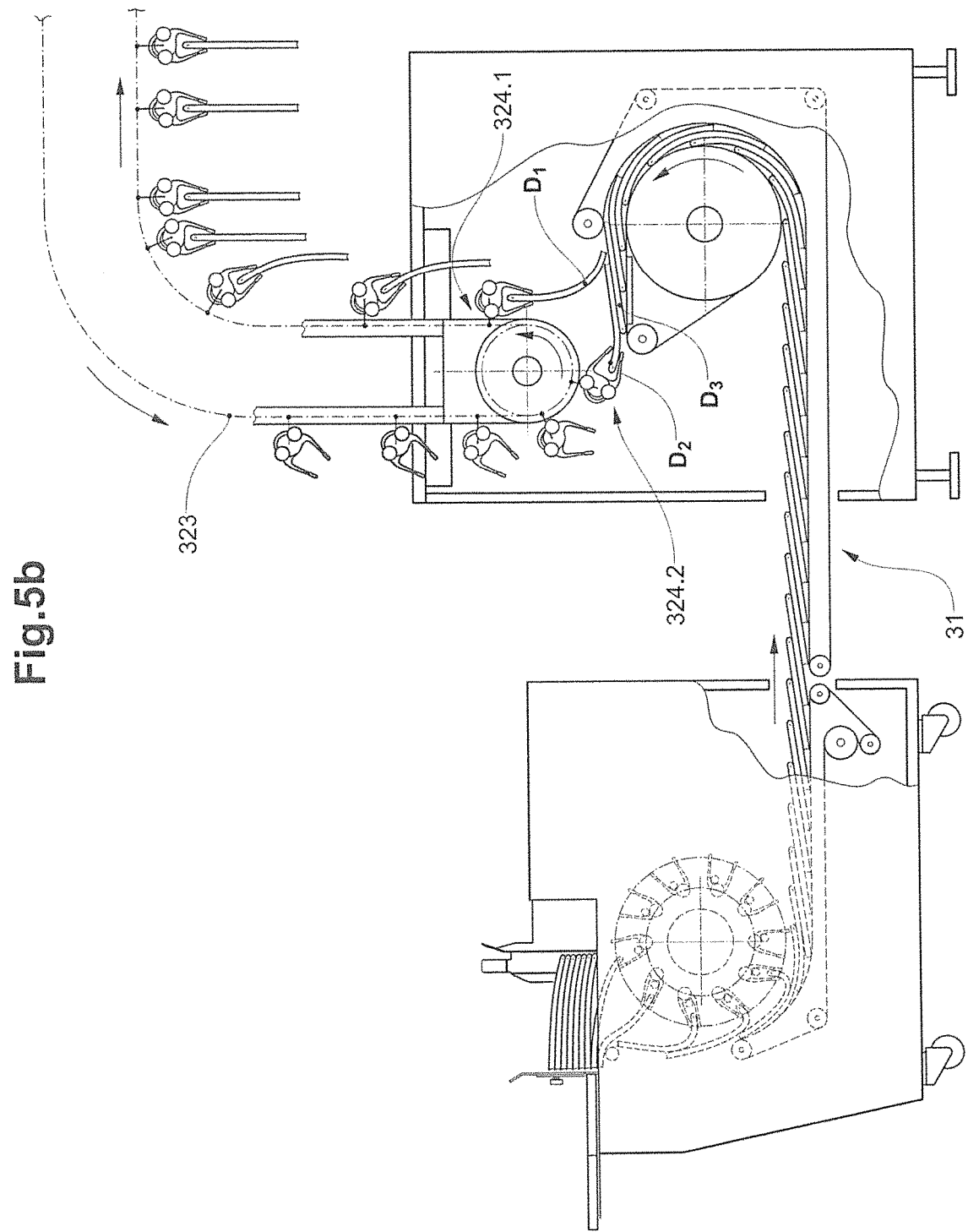

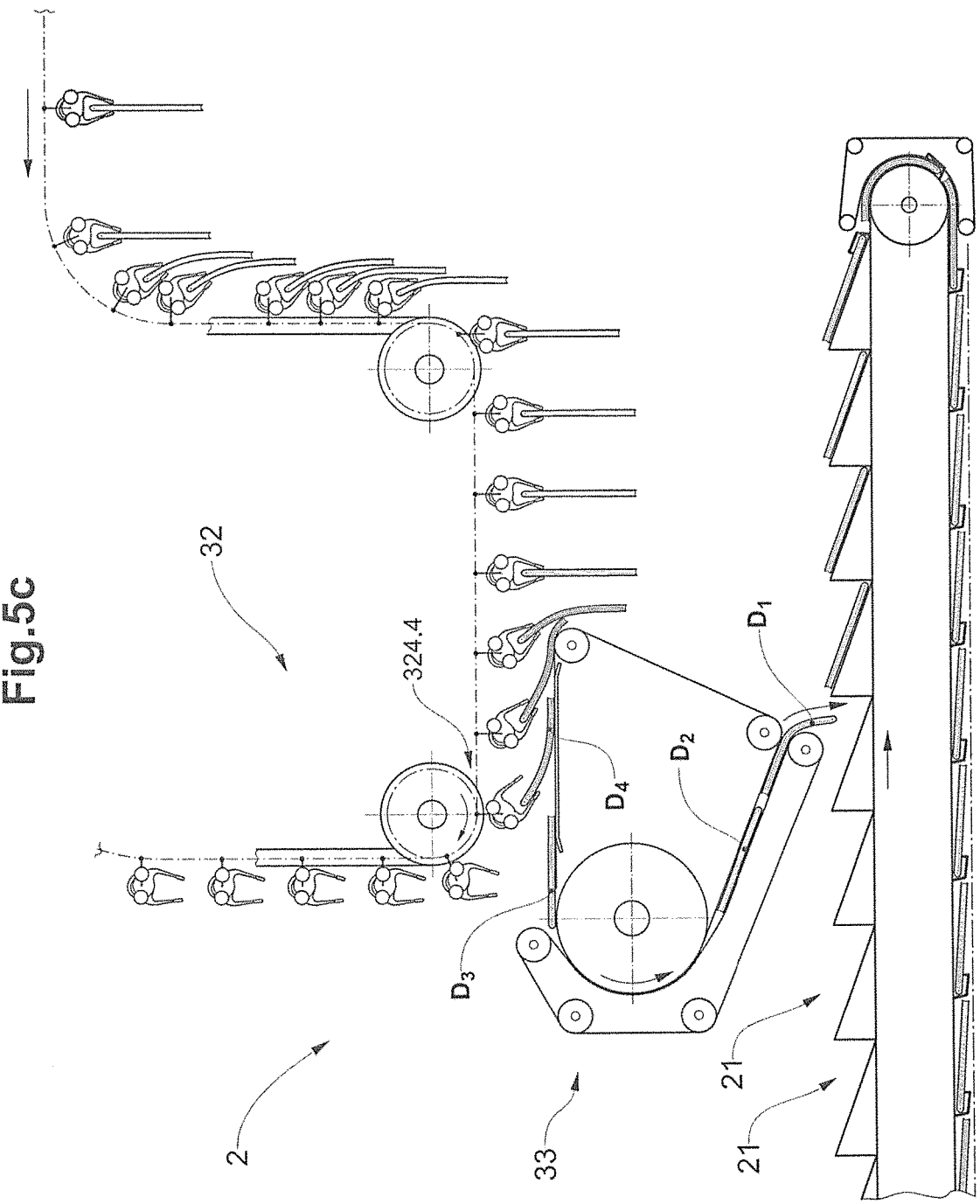

METHOD AND DEVICE FOR CREATING PACKS OF PRINTED PRODUCTS

CROSS-REFERENCE TO RELATED APPLICATION

Swiss Patent Application 00326/15, filed 2 Mar. 2015, the priority document corresponding to this invention, to which a foreign priority benefit is claimed under Title 35, United States Code, Section 119, and its entire teachings are incorporated, by reference, into this specification.

BACKGROUND OF THE INVENTION

Field of the Invention

The invention relates to a method for operating a postpress system for producing and processing printed products, in particular for forming stacks or packs of product units which are preferably composed of a wrapping product and a plurality or collection of part products and/or inserts. The present invention additionally relates to postpress systems for performing the method.

Greater and greater demands are being made of postpress operations by the growth in localization and/or personalization of the editorial content of the products, but in particular advertising inserts. On the one hand, processing capacities need to be increased in order to improve profitability, and on the other hand it is also necessary to be able to faultlessly put together customized products in the correct sequence to make packs for distribution channels with as little manual intervention as possible, and make them ready for dispatch.

In the highly competitive advertising market, greater and greater demands are being made of the suppliers of print advertising and hence on the postpress process, and there is less and less tolerance of faults. In order to be able to maximize the profitability of advertising budgets, advertising customers are increasingly requiring that print advertising, i.e. primarily printed products but also product samples and data media, be delivered for specific customers or addressees. The more expensive the individual advertising medium, the greater the pressure to be able to specify the group of addressees.

For the postpress process, this means that customized printed products, i.e. ones compiled for specific addressees, need to be produced for a specific distribution channel faultlessly and additionally in the correct product sequence and to be processed to make up packs.

Because advertising customers only accept very low error rates (in the order of one-tenth of one percent), errors during the compilation of the products must be avoided or corrected at great effort and expense by hand.

Discussion of Related Art

Different methods are known from the prior art for ensuring that the products are compiled in the correct order or sequence in order to minimize the manual repair effort.

A method and a device for creating a product flow from a plurality of product units in a predefined sequence are thus, for example, proposed in WO 2013/159238, by means of which faulty product units of a sequence can be corrected without interrupting production and whilst maintaining the predefined sequence. In this method for creating a synchronized product flow of product units in a predefined sequence, in a first step products are fed to the grouping section of a first conveying device, and a synchronized product flow of product units is then created from the fed products along the grouping section in a predefined sequence, and the product units are transferred in the predefined sequence to a discharging device and discharged in a synchronized product flow.

If faults occur during the creation of the product units, they can be corrected subsequently by one or more faulty product units being rejected at a rejecting station. The rejecting causes a gap in the synchronized flow of product units which has a length of one or more cycles, depending on the number of faulty rejected product units. A new product unit is then created for each faulty product unit. It is, however, in particular proposed that, when only individual products are missing in the product unit, the incomplete product unit is fed onwards to the grouping section and completed. The missing or faulty products or product units are subsequently created correctly in the grouping section and then transferred to the discharging device. In order to insert this product unit subsequently at the correct position within this sequence, to reproduce the predefined product sequence, a bypass device is provided in WO 2013/159238 which makes it possible, by bypassing a conveying path section, to feed product units to the discharging device following the product gap timewise. In this way, the predefined sequence of product units from the discharging device is made available for further processing processes fully sorted and in order.

The length of the discharging device which is bypassed by the bypass unit must be at least long enough to allow a number of product units to be accommodated which is at least as great as the number of products between a gap and the newly produced or corrected product unit. The products are transported in the discharging device in a synchronized manner and evenly spaced apart from one another. For example, if 40 conveying devices for feeding products are arranged on the upper side of the grouping section, it has a minimum length of 40 cycles. Because the product collections are held and transported along the lower side to an output point for transfer to the discharging device after they have passed through the upper side, the length increases to at least 80 cycles, i.e. the bypassed length of the discharging section must be at least 80 cycles long in order to be able to hold the whole quantity of product units between the gap and the corrected or newly produced product unit. In practice, the section will be significantly greater because of the lower number of feed units at the grouping section.

One of the main sources of faults in the production of product units, preferably printed end products such as collections of main and/or part products, inserts, leaflets, cards and the like, is the supply of the abovementioned products. Thus, for example, leaflets with poor paper quality often cause faults in the feed device, which result in it not being possible for these products to be correctly added to the collections or product units to be created. However, the same problem also occurs with very high-value products with coatings, of products made from a smooth film material which, on the one hand, are hard to grip and, on the other hand, often stick to one another with an electrostatic charge.

Because postpress businesses are subject to greater and greater pressure on quality, there is also a need to further reduce error rates in the production of route adapted packaged product flows, and at the same time to optimize use of the existing system capacity, in particular the stacking device capacity too.

SUMMARY OF THE INVENTION

An object of the present invention is therefore to make available a method and a device for creating a packaged product flow from a plurality of product units in a predefined sequence, in which correct route adapted packaged product units in a predefined sequence can be produced with a very low error rate, wherein faults can be eliminated in the creation of the product units without there being any need for the overall output or the processing speed of the postpress system to be reduced significantly.

According to the present invention, these objects are achieved by the elements of the independent claims. Further advantageous embodiments moreover follow from the dependent claims and the description.

The abovementioned objects are achieved by the present invention according to a first embodiment in particular by a method being made available for operating a postpress system for producing and processing product units, in particular printed end products with printed product collections comprising a plurality of products selected from the group of wrapping products, and a plurality of part products and/or inserts, to make route adapted stacks or packs, wherein at least some of the printed end products are individualized product units for specific addressees.

The method comprises the following steps:

i) Collecting printed product collections out of a plurality of printed products in holding units along a collecting section, wherein the printed products are fed to the holding devices by feed devices, comprising in each case a supply conveyor, a preparation circuit with a plurality of transport units and an output conveyor. Thus, in each case, one printed product is transferred at an output point of the supply conveyor to a transport unit of the preparation circuit, transported by the transport unit to the output conveyor and output to it. The products are then output by the output conveyor to the holding units, provided in each case, of the collecting section; and ii) Transferring the printed end products and transporting to the at least one stacking device for producing stacks or packs, which occur according to a product sequence $S_{ist}$ which, thanks to the use of the preparation circuit and the checking unit, corresponds with a high degree of reliability to the production sequence $S_{soll}$.

According to preferred embodiments of the method for operating a postpress system, the output conveyors output the printed products in a controlled fashion at the provided holding units of the collecting section. This means that the output conveyor only conveys a product into an arriving holding unit when such a product is provided for the collection in this holding unit. If this is not the case, no products are output.

According to further preferred embodiments, the preparation circuit outputs the printed products in a controlled fashion to the output conveyor. This means that the products are held in the preparation circuit until a product of the supplied type is needed for a collection in a holding unit. When controlling the output, it is important to pay attention to the length of the output conveyor in order to ensure that the required product is output to the output conveyor with sufficient forward motion that it can later be output to it at the right time to the correct holding unit. The output conveyors are preferably operated continuously.

According to a further embodiment, a checking unit checks that the transport units of the preparation circuit only leave the output point when they have picked up a printed product. An empty transport unit, i.e. a transport unit without a product, preferably reaches the output point at the same time as a printed product conveyed to the output point by the supply conveyor, which printed product is gripped at a leading edge by the retaining means of the transport unit, preferably a gripper clamp, and transported away. If there is no product present, the transport unit is held back at the output point until a printed product is supplied to be picked up. This is permitted by the uncoupling of the transport units which is explained in more detail below.

Checking whether a product is or will be supplied to be picked up by a transport unit can preferably take place optically. It can preferably happen directly at the output point or upstream in the output conveyor.

Checking whether a transport unit is or will be present to pick up the supplied printed product can also take place at the output point or upstream in the preparation circuit.

Using a postpress system for producing and processing product units according to the above described method, route adapted stacks or packs can be produced from product units, in particular from printed end products with product collections comprising a plurality of products, selected from the group of wrapping products, and a plurality of part products and/or inserts, in at least one stacking device. At least some of the printed end products are here product units customized for specific addressees. The postpress system comprises a collecting section, with a plurality of feed devices, and a collecting circuit with a plurality of holding units. At least one feed device comprises a supply conveyor, a preparation circuit with a plurality of transport units and an output conveyor. The feed devices of the postpress system are designed in such a way that they output the product units to be output in a controlled fashion to the holding unit, provided according to a production plan, of the collecting circuit. For this purpose, the output conveyor of the feed device can be designed in such a way that it outputs the products to the provided holding units of the collecting section in a controlled fashion, i.e. as required.

According to preferred embodiments, the preparation circuit is designed in such a way that it can output the printed products to the output conveyor in a controlled fashion.

The postpress system preferably comprises a checking unit which checks that the transport units of the preparation circuit only leave the output point when they have picked up a product. If there is no product ready to be picked up by a transport unit, retaining means are provided which hold back the transport unit at the output point and only release once there is a printed product present.

According to a preferred embodiment, the transport units of the preparation circuit are designed as grippers for gripping and releasably holding the products.

The transport units are preferably arranged on the preparation circuit independently of one another and can be conveyed at a variable distance from one another.

According to a further embodiment, the transport units are designed as carriages, with grippers, which can move freely along a track.

A further method for operating a postpress system for producing and processing product units, in particular printed end products with printed product collections comprising a plurality of products, selected from the group of wrapping products, and a plurality of part products and/or inserts, to make route adapted stacks or packs, at least some of the printed end products being product units being customized for specific addressees, comprises the following steps:

i) collecting product collections from a plurality of printed products in holding units of a collecting section, printed products being fed to the holding units by feed devices ii) completing the product units comprising the product collections iii) transferring the product units to a sorting device according to a product sequence iv) comparing the actual sequence of the individual product units of the product sequence ($S_{ist}$) with the planned sequence of product units according to a production sequence ($S_{soll}$)

v-a) transporting the product units, without any change in the sequence, through the sorting device with the product sequence ($S_{ist}$) matched to the production sequence ($S_{soll}$), or v-b) temporarily storing a repair group comprising a plurality of product units, with a sequence which deviates from the production sequence ($S_{soll}$), in a supply section of a directing group and subsequently conveying together, in the correct sequence, the corrected and/or newly produced product units with the product units of the repair group, and vi) transporting the product units, in the correct sequence, to at least one stacking device for producing route adapted packs.

As long as no faults occur during the production of the product units and the product sequence ($S_{ist}$) matches the production sequence ($S_{soll}$), the delivered product units can transit through the sorting device with no change in their sequence. This preferably takes place on a transit section selected for this purpose.

This transit section must not differ structurally from the supply sections and, as required, can also serve as a supply section. Likewise, a supply section can serve as a transit section.

A postpress system for producing and processing product units, in particular printed end products with printed product collections comprising a plurality of products, selected from the group of wrapping products, and a plurality of part products and/or inserts, in at least one stacking device to make route adapted stacks or packs, at least some of the printed end products being product units which have been customized for specific addressees, comprises a collecting section, with a plurality of feed devices and a collecting circuit with multiple holding devices for producing printed product collections, at least one intermediate conveyor for transporting the printed product collections from the collecting section to the at least one stacking device, the intermediate conveyor comprising multiple transport units for gripping and releasably retaining the products, and a sorting device.

The sorting device preferably comprises at least one directing group with at least one gate, a transit section and at least one supply section.

At least one of the plurality of feed devices is preferably a feed device with a supply conveyor, a preparation circuit with a plurality of transport units and an output conveyor, as described above.

The length of the supply section is preferably selected such that a plurality of product units, or respectively a plurality of transport units carrying product units, can be stored temporarily in the supply section.

It has proven to be advantageous if the length of the supply section permits the temporary storage of a number of product units which, in accordance with the production plan, belong to at least one pack. According to further preferred embodiments, the length of the supply section permits the temporary storage of a number of product units which, in accordance with the production plan, belong to more than one pack. If a fault occurs in the production of the product units, all the correctly produced product units can be temporarily stored in the supply section until the faulty product units have been corrected or a correct product unit has been newly produced. This corrected or newly produced product unit is transported to the sorting device and is there combined with the waiting product units to form the correct sequence for a pack.

For this purpose, the corrected or newly produced product unit, together with further product units which deviate from the production sequence ($S_{soll}$), is transported to the sorting device. In order to ensure that in each case the correct product units can be fed to the stacking unit in the correct sequence for a pack to be produced in the stacking device, in this case the corrected or newly produced product unit must be guided, preferably onto the transit section, by means of the at least one gate, separated from the remaining product units. The remaining product units, which together form a pack in the correct sequence, are preferably guided onto a further supply section.

The product units situated in the correct sequence ahead of the corrected or newly produced product unit are channelled from the supply section onto the transit section by means of an input gate. The corrected or newly produced product unit can here be decelerated and/or held back before the input gate.

The gate is then switched such that the corrected or newly produced product unit can be guided in the correct sequence to the preceding product units and finally the remaining product units, following in the correct pack sequence, are fed, after further switching of the gate, from the supply section behind the corrected or newly produced product unit, and the group of product units for a pack, now present in the correct sequence, can be conveyed onwards to the stacking unit.

The transport units of the intermediate conveyor are particularly preferably arranged so that they can be conveyed of one another and at a variable distance from one another, and are designed, for example, as carriages, which can move freely in a track, with grippers.

According to a further embodiment, a carriage can be placed in storage in the directing group on in each case one of a plurality of supply sections by means of one or more gates.

A carriage can preferably be actively or passively removed from storage in the directing group from in each case one of a plurality of supply sections, and can be combined by means of one or more gates with further carriages from the same and/or other supply sections to make up a predefined sequence, wherein the latter matches the production sequence.

In a further embodiment, the customization of the product units to be produced does not or not only take place as a result of individual, i.e. addressee-specific compilation of the product collections, and instead a product unit in the form of a customized printed end product is produced in such a way that the latter comprises a printed product produced (preferably digitally printed) individually for the addressees.

This individually produced printed product can be an insert in the product collection and/or a wrapping product or an envelope which wraps the printed product collection or which surrounds the printed product collection.

The wrapping product can be a personalized printed product which is preferably selected from the group comprising folded printed sheets, a main or a part product, an envelope, which are preferably in each case personalized for specific addressees.

According to further embodiments, instead of or in addition to the wrapping, the printed product collections are detachably connected with an adhesive element.

In an embodiment, a personalized printed end product is produced in such a way that the personalized printed end product has a printed product collection and an individually produced printed product, which are bonded to each other. The printed product collection and the personalized printed product are bonded to each other in particular detachably, the bonding taking a form such that it can be detached without damaging the products.

A production device for producing customized printed end products preferably comprises a control centre which is configured for the following steps: creating end product specifications which in each case define at least one customized printed end product, creating sales orders on the basis of end product specifications, a sales order defining at least one sequence of printed product collections, and initiating the creation of and creating digitally printed orders on the basis of end product specifications and sales orders, a digitally printed order defining at least one customized printed product. The control centre is moreover configured for controlling the following production steps: producing, using the collecting section and the feed devices, printed product collections according to the sales orders, producing, using a digital printing press, customized printed products according to the digitally printed orders, and producing, using the collecting section and/or the wrapping device and/or an inserting device, customized printed end products from the produced printed product collections and customized printed products.

BRIEF DESCRIPTION OF THE DRAWINGS

The invention is explained in detail below with the aid of exemplary embodiments on connection with the drawings, in which:

FIG. 2 shows a schematic plan view of a second exemplary embodiment of a postpress system according to the invention with a collecting section with eight feed devices, a collecting conveyor, a wrapping station, an intermediate conveyor with a sorting device, comprising six supply sections in a directing group, two stacking devices and an output device;

FIG. 3 shows a schematic side view of a portion of a preparation circuit according to FIG. 1 with a portion of a track on which four freely movable transport units in the form of carriages with grippers transport, in suspended fashion, a first type of printed products;

FIG. 4 shows a schematic side view of a portion of a supply section of a directing group of a sorting device according to FIG. 2 with a portion of a track on which four freely movable transport units in the form of carriages with grippers transport a first type of printed end products;

FIG. 5a shows a schematic view of a further exemplary embodiment of a collecting section according to the invention with feed devices, two of which are designed as feed devices, each with a supply conveyor, a preparation circuit and a collecting conveyor;

FIG. 5b shows a perspective detailed enlargement of the outputting of a printed product at an output point of the supply conveyor to a transport unit of a preparation circuit according to FIG. 5a; and FIG. 5c shows a perspective detailed enlargement of an output conveyor of a feed device according to FIG. 5a, in which the transfer of printed products from a transport unit of the preparation circuit to the output conveyor and the outputting of printed products to holding units of the collecting section are shown.

DESCRIPTION OF PREFERRED EMBODIMENTS

Figure 1:
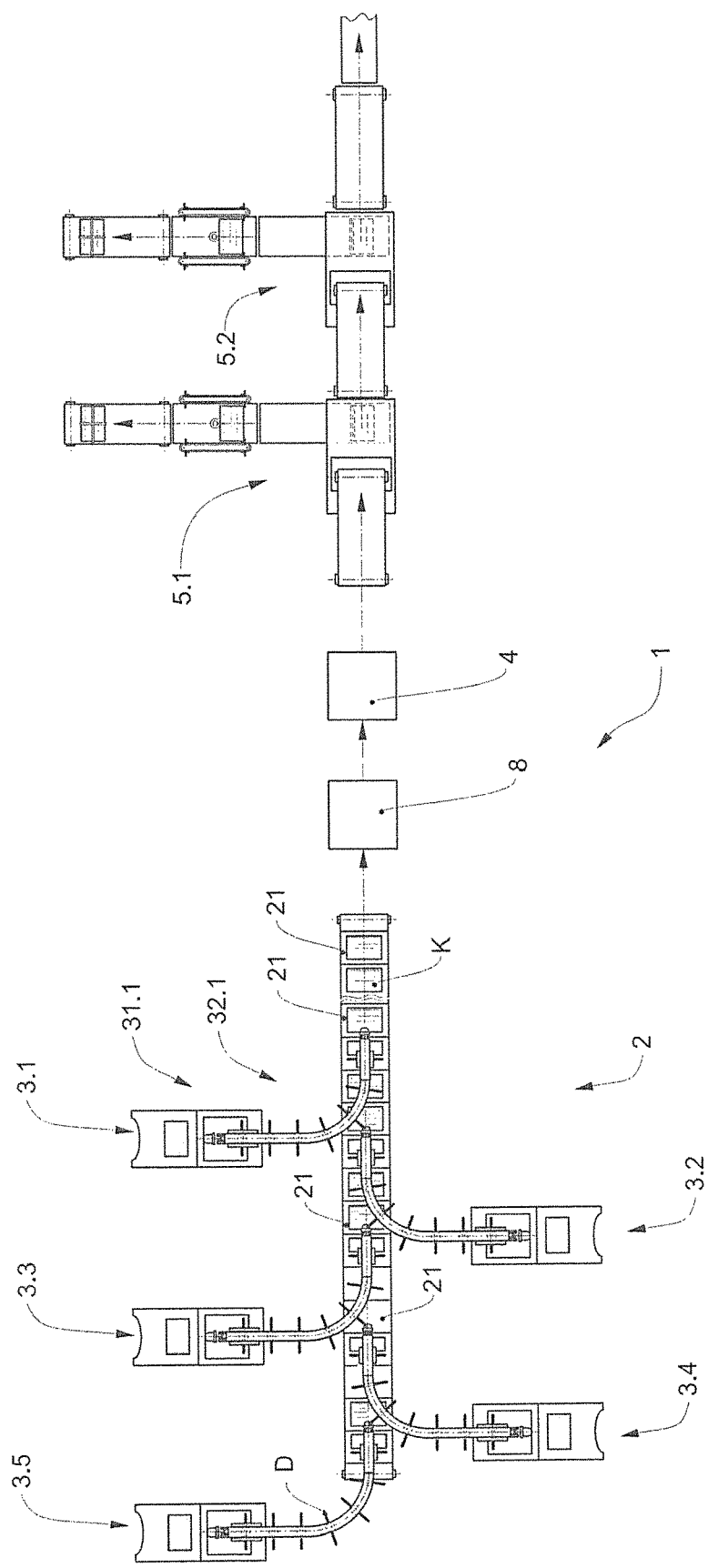
FIG. 1 shows a schematic plan view of a first exemplary embodiment of a postpress system according to the invention with a collecting section with five feed devices, each with a preparation circuit and a collecting conveyor, a wrapping station, an intermediate conveyor, two stacking devices and an output device.

A schematic plan view of a first exemplary embodiment of a postpress system according to the invention is shown in FIG. 1. Collections of printed products D are produced in a collecting section 2 with five feed devices 3.1-3.5. The feed devices 3.1-3.5 each comprise a supply conveyor 31.1, a preparation circuit 32.1 with a plurality of transport units, and an output conveyor which is not shown in FIG. 1. Up to five different types of printed products are output by the five feed devices 3.1-3.5 to a collecting circuit with a plurality of holding units 21.

In this way, collections of printed products which are preferably compiled for specific addressees are produced which, after having transited the collecting section are wrapped in the exemplary embodiment shown in a wrapping station 8 with wrapping products which are preferably produced for specific addressees, for example digitally printed folded printed sheets.

After the wrapping station 8, the now complete product units P in the correct product sequence are picked up by an intermediate conveyor 4, preferably a gripper transporter, which can transport and output the product units in the example shown selectively to one of the two stacking units 5.1, 5.2. The transport and the output take place in accordance with a pre-established production plan so that all the product units arrive in the correct product for their distribution channel in the correct sequence.

Details about an output conveyor 33 according to a preferred embodiment can be deduced from FIG. 5c. The output conveyor 33 is designed as a belt conveyor such that it outputs the products $D_1$, $D_2$, $D_3$, $D_4$ individually from above to the provided holding units 21 of the collecting section 2″. The printed products $D_1$, $D_2$, $D_3$, $D_4$ are deposited by individual transport units 324.4 of the preparation circuit on a depositing area, arranged at the upper side, of the output conveyor. The outputting of the products $D_1$, $D_2$, $D_3$, $D_4$ from the preparation circuit is controlled by means of control means (not shown in the drawing) in such a way that the output conveyor can run continuously at the speed matched to the conveying speed of the holding units. If no product is needed for a holding unit, then the outputting of the product from the gripper of the corresponding transport unit is suspended. In the example shown in FIG. 5c, this happens after the outputting of the product $D_2$. The following product $D_3$ was output only after a delay of two cycles so that a gap of two product cycles has occurred in the production flow on the output conveyor 33. After the products $D_1$ and $D_2$ have been output into two successive holding units 21, the two following successive holding units 21 are not supplied with products. Two products $D_3$ and $D_4$ are then output again into the holding units.

It is ensured that the products $D_1$, $D_2$, $D_3$, $D_4$ are transported onwards by the transport units in a sequence with no gaps and can be output in a controlled fashion, by virtue of the fact that in each case one printed product $D_1$, $D_2$, $D_3$ is transferred to each transport unit of a preparation circuit 32 at an output point of the supply conveyor 31, as shown in FIG. 5b. In the exemplary embodiment shown, the clamp arranged on the carriage 324.1 has gripped a product $D_1$ and has been conveyed with the carriage by means (not shown in the drawing) in the conveying direction away from the transfer point towards the output conveyor. The product $D_2$ supplied next by the supply conveyor 31 arrived at the output point with a delay and can now be picked up by the waiting transport unit with the carriage 324.2. Owing to the unsynchronized conveying system in the preparation circuit, the short waiting period has no negative effect.

A schematic side view in FIG. 3 of a portion of the preparation circuit according to FIG. 1 or FIG. 5 shows that gaps between the individual transport units 321, caused by the waiting period, can be compensated for easily, or reduced, owing to the ability of the carriages 324.1-324.4 to move freely on the track 323. In the illustration in FIG. 3, the carriages 324.1-324.4 run in the conveying direction F on the track 323 from right to left. The gripper clamps attached to the carriages are all closed and all hold a printed product $D_1$-$D_4$. The leading carriage 324.1 has been decelerated by delaying means (not shown in the drawing) such that the gap to the following carriage 324.2 has reduced markedly in comparison with the subsequent carriages 324.3 and 324.4, which each have larger gaps between them. Because the four freely movable transport units in the form of carriages 324.1-324.4 each transport, in suspended fashion, a first type of printed products $D_1$-$D_4$, the gap between these products $D_1$-$D_4$ also reduces correspondingly. In this way, it can be ensured very simply that the products can be output in the required quantity and with no interruption or gaps to the transfer conveyor and hence to the holding units of the collecting circuit.

A schematic plan view of a second exemplary embodiment of a postpress system according to the invention is shown in FIG. 2. Collections of printed products are produced in a collecting section with eight feed devices 3.1' to 3.8'. The feed devices 3.1' to 3.8' can be conventional sheet feeders and/or feed devices of the above described type with a preparation circuit. A wrapping station 8, in which the collections can be wrapped, is arranged following the collecting conveyor 2. After wrapping, a transfer unit 4 of an intermediate conveyor transfers the completed product units which are preferably present as printed end products with an addressee-specific product collection and/or an addressee-specific wrapping. The intermediate conveyor comprises a sorting device 6 which, in the exemplary embodiment shown, has a transit section 621 and three supply sections 611 arranged in each case on the left-hand and right-hand side. A directing group with five input gates, namely a 3-way gate 62 and four downstream 2-way gates 622 is positioned upstream of the six supply sections 611. Incoming transport units in the form of carriages can be distributed in a controlled fashion via the input gates 62, 622 onto the transit section or onto one of the supply sections 611.

Correctly compiled product units in the correct production sequence are preferably guided through the sorting device on the transit section 612 without any movement of the gates and processed in the two stacking devices arranged downstream to make up correctly sequenced packs.

If faults occur in the production of the product units, and individual or multiple product units need to be corrected or newly produced, the correctly produced product units of a group are diverted in the sorting device 6 via the inlet gates 62, 622 onto a supply section and temporarily stored there.

Such a repair group will usually comprise a group of product units which are provided for a common pack.

The corrected or newly produced product unit is placed in the correct sequence position within its group in the sorting device. To do this, it is preferably guided on the transit section through the sorting device to an input gate 63. Depending on their position in the predefined pack, those product units of the repair group preceding it are moved from the supply section 611 onto an outlet section 64 via the input gates 631, 63, and then the gate 63 is switched to the transit section and the corrected or newly produced product unit is added in the correct sequence. The gate 63 is then is switched back to the supply section with the remaining product units of the repair group and these are fed in the correct sequence to the group for the common pack.

If the corrected or newly produced product unit is delivered precisely between two pack sequence groups, then the combining takes place in a very simple way. The product units of the leading group are guided via the input gate and the following group is preferably decelerated and are held back/accumulate in the transit section until the corrected or newly produced product unit is added to its group in the correct sequence.

If the corrected or newly produced product unit is delivered among a group of product units for a different pack, these product units that belong together are diverted in the directing group in the correct sequence onto a supply section 611, just the corrected or newly produced product unit is passed onto the transit section and, as described above, is combined with its pack group in the correct sequence. The temporarily stored group can then be fed from the supply section 611 to the stacking devices in order to form the pack.

If the production of the corrected or newly produced product units takes place very quickly and if the size and storage capacity of the sorting device allows it, the group for correction and all the following pack groups can be stored temporarily until the arrival of the corrected or newly produced product unit on the supply sections. In this case, the product units including the corrected or newly produced product unit can be output to the stacking devices in the completely correct production sequence, and there is no need for any manual correction at all to take place.

If the production of the corrected or newly produced product units takes place quickly enough and/or if the size and storage capacity of the sorting device is insufficient to temporarily store the group for correction and all the following pack groups until the arrival of the corrected or newly produced product unit on the supply sections, the correct sequence of the product units within all the packs is nevertheless ensured. The pack produced from the corrected sequence of product units must, however, still be brought to the correct position within the sequence of packs for the corresponding delivery channel.

A schematic side view in FIG. 4 shows how the gaps between the freely movable transport units in the form of carriages 324.5-324.8 can in turn be varied. The grippers 322.5-322.8 each hold a complete product unit $P_5$-$P_8$. Whilst the product units $P_5$ and $P_6$ are situated on the track 323 of a supply section still with a small spacing between them in a space-saving fashion, the products $P_7$ and $P_8$ are conveyed by conveying means (not shown) in accelerated fashion towards an input gate situated outside the portion shown in the drawing. The conveying can take place actively and with full assistance or, in some parts, also passively under the effect of gravity.

A further exemplary embodiment of a collecting section 2" according to the invention with five feed devices is shown in FIG. 5*a*, three of which are designed as conventional feed conveyors and two as feed devices 3.1 and 3.2, each with a supply conveyor, a preparation circuit and an output conveyor.

Owing to their low fault rate, it has proved to be advantageous to retrofit each of the new feed devices with a supply conveyor, a preparation circuit and an output conveyor even for existing collecting sections. They are then preferably used to convey very difficult printed products, for example very thin products, products with very poor paper quality or very smooth or hard-to-separate products.

I claim:

1. A method for operating a postpress system (1) for producing and processing printed end products (P) with printed product collections including a plurality of products selected from the group of wrapping products, and a plurality of part products and/or inserts, to make route adapted stacks or packs, wherein at least some of the printed end products (P) are individualized product units for specific addressees, comprising the following steps:
   i) collecting printed product collections out of a plurality of printed products (D) in holding units (21) along a collecting section (2), wherein printed products (D) are fed to the holding units (21) by feed devices (3), each of the feed devices (3) including a supply conveyor (31), a preparation circuit (32) with a plurality of transport units (321) and an output conveyor (33), wherein the transport units (321) are arranged on the preparation circuit (32) independently of one another and can be conveyed at a variable distance from one another and the transport units (321) comprise carriages, with grippers (322), which can move freely in a track and wherein, in each case, one printed product (D) is transferred at an output point of the supply conveyor (31) to a transport unit (321) of a preparation circuit (32), transported by the transport unit to the output conveyor (33) and output to it, and subsequently the output conveyor (33) outputs the products (D) to the provided holding units (21) of the collecting section (2, 2"), wherein the feed device outputs the printed products to the collecting section in a controlled fashion;
   ii) transferring the printed end products (P) to a sorting device (6) according to a product sequence ($S_{ist}$);
   iii) comparing an actual sequence of the individual printed end products of the product sequence ($S_{ist}$) with a planned sequence of printed end products according to a production sequence ($S_{soll}$);
   iv) one of:
      a) transporting the printed end products (P), without any change in the sequence, through the sorting device with the product sequence ($S_{ist}$) matched to the production sequence ($S_{soll}$), and
      b) temporarily storing a repair group (R) comprising a plurality of printed end products (P), with a sequence which deviates from the production sequence ($S_{soll}$), in a supply section (611) of a directing group and subsequently conveying together, in the correct sequence, the corrected and/or newly produced printed end products with the printed end products of the repair group; and
   v) transferring the printed end products (P) in an actual product sequence ($S_{ist}$) to at least one stacking device (5.1, 5.2) for producing stacks or packs.

2. The method for operating a postpress system (1) according to claim 1, wherein the preparation circuit (32) outputs the printed products to the output conveyor (33) in a controlled fashion.

3. The method for operating a postpress system (1) according to claim 1, wherein the output conveyor (33) outputs the products (D) in a controlled fashion to the provided holding units (21) of the collecting section (2).

4. The method for operating a postpress system (1) according to claim 1, wherein a checking unit checks that the transport units (321) of the preparation circuit (32) only leave the output point when they have picked up a product (D).

5. The postpress system (1) according to claim 1, wherein the grippers (322) function to grip and releasably retain he products (D).

6. The method for operating a postpress system (1) according to claim 1, wherein the sorting device comprises at least one directing group with at least one gate, a transit section and at least one supply section.

7. A postpress system (1) for producing and processing printed end products (P) with printed product collections including a plurality of products (D), selected from the group of wrapping products, and a plurality of part products and/or inserts, in at least one stacking device (5.1, 5.2) to make route adapted stacks or packs, at least some of the printed end products (P) being product units which have been customized for specific addressees, comprising:
   a collecting section (2, 2"), with a plurality of feed devices (3), each of the feed devices comprising a supply conveyor (31), a preparation circuit (32) with a plurality of transport units (321) and an output conveyor (33), and a collecting circuit with a plurality of holding devices (21), wherein the transport units (321) are arranged on the preparation circuit (32) independently of one another and can be conveyed at a variable distance from one another and the transport units (321) comprise carriages, with grippers (322), which can move freely in a track and wherein the feed devices are designed such that they output the products (D) to the plurality of holding devices (21) of the collecting section (2, 2") in a controlled fashion via the preparation circuit (32) and
   a sorting device (6), the sorting device to allow transport of the printed end products (P) which are in correct sequence directly through the sorting device and to temporarily store printed end products belonging to a repair group (R) in a supply path (611) of a direction group until the group is repaired and at the same time correct groups may be passed through the sorting device.

8. The postpress system (1) according to claim 7, wherein the preparation circuit (32) is designed for the controlled output of the printed products (D) at the output conveyor (33) and/or the output conveyor (33) is designed for the controlled output of the printed products (D) to the provided holding units (21) of the collecting section (2, 2").

9. The postpress system (1) according to claim 7, wherein a checking unit is provided which checks that the transport units (321) of the preparation circuit (32) only leave the output point when they have picked up a product (D).

10. The postpress system (1) according to claim 7, wherein the grippers (322) function to grip and releasably retain the products (D).

11. The postpress system (1) according to claim 7, wherein the sorting device comprises at least one directing group with at least one gate, a transit section and at least one supply section.

12. A method for operating a postpress system (1') for producing and processing product units with printed product collections including a plurality of printed products (D), selected from the group of wrapping products, and a plurality of part products and/or inserts, to make route adapted stacks or packs (S), at least some of the product units being customized for specific addressees, comprising the following steps:
  i) collecting product collections from a plurality of printed products (D) in holding units (21) of a collecting section (2', 2"), printed products (D) being fed to the holding units by feed devices (3);
  ii) completing the product units (P) comprising the product collections;
  iii) transferring the product units (P) to a sorting device (6) according to a product sequence ($S_{ist}$);
  iv) comparing an actual sequence of the individual product units of the product sequence ($S_{ist}$) with a planned sequence of product units according to a production sequence ($S_{soll}$);
  v) one of:
    a) transporting the product units (P), without any change in the sequence, through the sorting device with the product sequence ($S_{ist}$) matched to the production sequence ($S_{soll}$), wherein the product units are transported in the sorting device by transport units which are arranged independently of one another and can be conveyed at a variable distance from one another, the transport units comprise carriages with grippers which can move freely in a track, and
    b) temporarily storing a repair group (R) comprising a plurality of product units (P), with a sequence which deviates from the production sequence ($S_{soll}$), in a supply section (611) of a directing group and subsequently conveying together, in the correct sequence, the corrected and/or newly produced product units with the product units of the repair group; and
  vi) transporting the product units (P), in the correct sequence, to at least one stacking device (5.1, 5.2) for producing route adapted packs.

13. The method for operating a postpress system (1') according to claim 12, wherein the sorting device comprises at least one directing group with at least one gate, a transit section and at least one supply section.

14. A postpress system (1') for producing and processing printed end products (P) with printed product collections including a plurality of products (D), selected from the group of wrapping products (A), and a plurality of part products and/or inserts, in at least one stacking device (5.1, 5.2) to make route adapted stacks or packs, at least some of the printed end products (P) being product units which have been customized for specific addressees, comprising:

a collecting section (2', 2"), with a plurality of feed devices (3) and a collecting circuit with multiple holding devices (21) for producing printed product collections, each of the feed devices (3) including a preparation circuit (32) with a plurality of transport units (321) and an output conveyor (33) disposed between the each of the feed device (3) and the collecting circuit, wherein the transport units (321) are arranged on the preparation circuit (32) independently of one another and can be conveyed at a variable distance from one another and the transport units (321) comprise carriages, with grippers (322), which can move freely in a track;
  at least one intermediate conveyor (4) for transporting the printed product collections from the collecting section (2) to the at least one stacking device (5.1, 5.2), wherein the intermediate conveyor (4) comprises multiple transport units (321) for gripping and releasably retaining the products (D); and
  a sorting device (6), the sorting device to allow transport of the printed end products (P) which are in correct sequence directly through the sorting device and to temporarily store printed end products belonging to a repair group (R) in a supply path (611) of a direction group until the group is repaired and at the same time correct groups may be passed through the sorting device.

15. The postpress system (1') according to claim 14, wherein the sorting device (6) comprises at least one directing group with at least one gate (62) and at least one supply section (611).

16. The postpress system (1') according to claim 15, wherein a carriage (324) can be placed in storage in the directing group on in each case one of a plurality of supply sections (611) by means of one or more gates (62, 622).

17. The postpress system (1') according to claim 15, wherein a carriage (324) can be actively or passively removed from storage in the directing group from in each case one of a plurality of supply sections (611), and can be combined by means of one or more gates (63, 631) with further carriages (324) from the same or other supply sections (611) to make up a predefined sequence.

18. The postpress system (1') according to claim 14, wherein the transport units (321) of the intermediate conveyor (4) are arranged independently of one another and can be conveyed at a variable distance from one another and are designed as carriages (324), with grippers (322), which are freely movable in a track (323).

\* \* \* \* \*